(No Model.)
E. H. CRANE.
FISH HOOK.
No. 551,581. Patented Dec. 17, 1895.
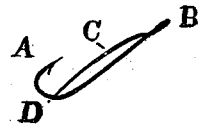
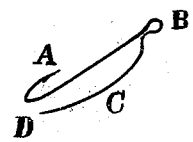
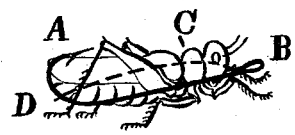
Witnesses.
Worth Laudon
Belle Cross.
Inventor.
Elliott. H. Crane.

UNITED STATES PATENT OFFICE.

ELLIOTT H. CRANE, OF NILES, MICHIGAN.

FISH-HOOK.

SPECIFICATION forming part of Letters Patent No. 551,581, dated December 17, 1895.

Application filed February 16, 1893. Serial No. 462,591. (No model.)

*To all whom it may concern:*

Be it known that I, ELLIOTT H. CRANE, residing at Niles, in the county of Berrien and State of Michigan, have made certain new and useful Improvements in Fish-Hooks, of which the following is a specification.

My improvement consists in providing a fish-hook proper with an attachment which serves as a bait-holder, the same being constructed and arranged as hereinafter described.

In the accompanying drawings, Figure 1 is a side view of a hook provided with my improved bait-holder. Fig. 2 is a side view of a modification. Fig. 3 is a side view illustrating the manner of securing bait to the hook by means of my attachment.

As shown in Figs. 1 and 3, my invention consists of an ordinary barbed fish-hook A, provided with an elastic (or spring) pin or prong C, which extends alongside the straight shank to a point B contiguous to the junction of the shank with the hook proper D, or with the curved or semicircular portion. This pin or prong C is shown formed in one piece with the hook-shank. In other words, it is an extension of the shank recurved or bent back upon the latter, the two being so constructed as to form an eye B for attachment of a line. The pin C is arranged on the same side of the shank as the point A of the hook, and is also slightly curved outward from the shank, and its point is held elastically on the shank, as shown. Its point is barbed in order to enable it to hold the bait securely, and tapered or sharpened to adapt it to be easily inserted in the bait.

The modified form shown in Fig. 2 differs only in the arrangement of the bait-pin on the opposite or outer side of the hook-shank.

In Fig. 3, a bait—a grasshopper—is shown impaled on the pin C. It will be noted said bait is held in position parallel to the hook-shank so as to practically conceal the latter (D), while the hook proper A projects entirely free for catching in the mouth of a fish, being, in fact, as free as if the bait-pin were entirely absent.

The elasticity of the pin C enables its point to be pressed and held away from the shank for application of the bait thereon, but causes it to instantly resume its former and normal position when released, so that the bait is prevented from becoming detached.

Having thus described my invention, what I claim is—

The improved bait-holding fish-hook, composed of a barbed hook proper, and a spring pin formed integrally with the hook shank and extending alongside the same, said pin being curved outward from the shank and its point normally crossing and bearing elastically upon the shank at the point where it merges into the hook proper, as shown and described.

ELLIOTT H. CRANE.

Witnesses:
 WORTH LANDON,
 BELLE CROSS.